(12) United States Patent
Okabe et al.

(10) Patent No.: US 12,083,931 B2
(45) Date of Patent: Sep. 10, 2024

(54) FUEL CELL SYSTEM AND AIR VEHICLE

(71) Applicant: TOYOTA JIDOSHA KABUSHIKI KAISHA, Toyota (JP)

(72) Inventors: Hiroki Okabe, Mishima (JP); Tomohiro Shinagawa, Shizuoka-ken (JP); Yoshihiro Shinozaki, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 279 days.

(21) Appl. No.: 17/659,933

(22) Filed: Apr. 20, 2022

(65) Prior Publication Data
US 2022/0340046 A1 Oct. 27, 2022

(30) Foreign Application Priority Data

Apr. 23, 2021 (JP) ................ 2021-073152

(51) Int. Cl.
*B60L 58/33* (2019.01)
*B64D 41/00* (2006.01)
*H01M 8/00* (2016.01)
(52) U.S. Cl.
CPC .............. *B60L 58/33* (2019.02); *B64D 41/00* (2013.01); *H01M 8/00* (2013.01); *B60L 2200/10* (2013.01); *B64D 2041/005* (2013.01)

(58) Field of Classification Search
CPC ...... H01M 8/04029; H01M 8/00; B60L 58/33; B60L 2200/10; B64D 41/00
See application file for complete search history.

(56) References Cited

U.S. PATENT DOCUMENTS

| 2010/0112404 A1 | 5/2010 | Yamagishi et al. |
| 2014/0023945 A1 | 1/2014 | Epstein et al. |

FOREIGN PATENT DOCUMENTS

| EP | 2 325 038 A1 | 5/2011 |
| JP | 2017-081559 A | 5/2017 |

*Primary Examiner* — Sarah A. Slifka
(74) *Attorney, Agent, or Firm* — Dickinson Wright, PLLC

(57) ABSTRACT

To provide a fuel cell system configured to prevent the freezing of the gas and water discharge valve of the fuel gas system even at high altitude. A fuel cell system for air vehicles, wherein the fuel cell system comprises: a fuel cell, a fuel gas system for supplying fuel gas to the fuel cell, a cooling system for controlling a temperature of the fuel cell, an altitude sensor, a temperature sensor, and a controller, and wherein, when the controller detects an altitude increase measured by the altitude sensor, and when a temperature of the gas and water discharge valve measured by the temperature sensor is less than a predetermined temperature, the controller increases a temperature of the refrigerant by controlling the three-way valve to circulate the refrigerant in the heating flow path and operating the circulation pump and the water heater to heat the refrigerant.

1 Claim, 2 Drawing Sheets

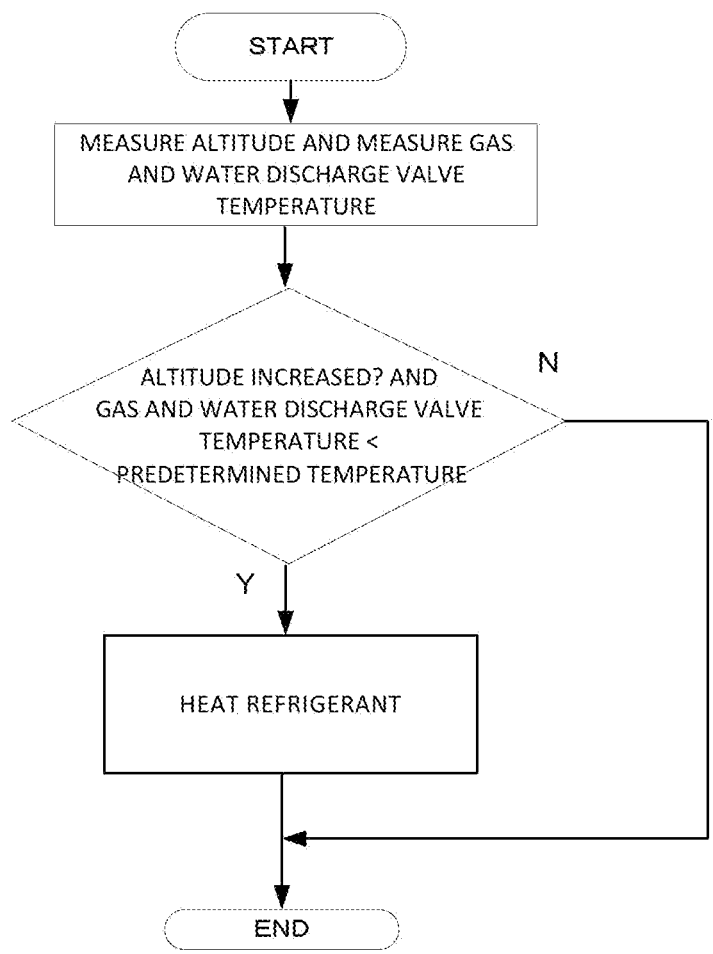

FUEL CELL SYSTEM AND AIR VEHICLE

TECHNICAL FIELD

The disclosure relates to a fuel cell system and an air vehicle.

BACKGROUND

A fuel cell (FC) is a power generation device which is composed of a single unit fuel cell (hereinafter, it may be referred to as "cell") or a fuel cell stack composed of stacked unit fuel cells (hereinafter, it may be referred to as "stack") and which generates electrical energy by electrochemical reaction between fuel gas (e.g., hydrogen) and oxidant gas (e.g., oxygen). In many cases, the fuel gas and oxidant gas actually supplied to the fuel cell, are mixtures with gases that do not contribute to oxidation and reduction. Especially, the oxidant gas is often air containing oxygen.

Hereinafter, fuel gas and oxidant gas may be collectively and simply referred to as "reaction gas" or "gas". Also, a single unit fuel cell and a fuel cell stack composed of stacked unit cells may be referred to as "fuel cell".

Various studies have been made on fuel cells.

For example, Patent Literature 1 discloses an aircraft using fuel cells.

Patent Literature 1: Japanese Patent Application Laid-Open (JP-A) No. 2017-081559

In the case of mounting a fuel cell in an air vehicle, compared to the case of mounting a fuel cell in a car, power generation of the fuel cell is carried out in the condition with high altitude and low temperature.

At high altitude and low temperature, the temperature of the gas and water discharge valve in the fuel gas system decreases. As a result, generated water is frozen, and gas and water cannot be discharged from the gas and water discharge valve due to the water freezing. Since water cannot be discharged from the gas and water discharge valve, the concentration of nitrogen increases, and a decrease in hydrogen partial pressure (partial hydrogen deficiency) occurs. As a result, hydrogen deficiency occurs in the fuel cell, and the durability of the fuel cell is decreased. Accordingly, it is necessary to impose a limit on the output, and it is also necessary to stop the system.

SUMMARY

The present disclosure vias achieved in light of the above circumstances. An object of the present disclosure is to provide a fuel cell system configured to prevent the freezing of the gas and water discharge valve of the fuel gas system even at high altitude.

The fuel cell system of the present disclosure is a fuel cell system for air vehicles,
wherein the fuel cell system comprises:
a fuel cell,
a fuel gas system for supplying fuel gas to the fuel cell,
a cooling system for controlling a temperature of the fuel cell,
an altitude sensor,
a temperature sensor, and
a controller;
wherein the fuel gas system comprises a fuel gas supplier and a gas and water discharge valve for allowing fuel off-gas, which is discharged from the fuel cell, to be discharged to the outside;
wherein the cooling system comprises a refrigerant flow path for circulating a refrigerant in and out of the fuel cell and a heating flow path for heating the gas and water discharge valve by circulating the refrigerant, and the heating flow path branches from the refrigerant flow path and is disposed near the gas and water discharge valve;
wherein the heating flow path includes a circulation pump for circulating the refrigerant in the heating flow path, a water heater for heating the refrigerant, and a three-way valve for controlling a supply of the refrigerant from the refrigerant flow path and allowing the refrigerant to be circulated in the heating flow path; and
wherein, when the controller detects an altitude increase measured by the altitude sensor, and when a temperature of the gas and water discharge valve measured by the temperature sensor is less than a predetermined temperature, the controller increases a temperature of the refrigerant by controlling the three-way valve to circulate the refrigerant in the heating flow path and operating the circulation pump and the water heater to heat the refrigerant.

The air vehicle of the present disclosure is an air vehicle comprising the fuel cell system described above.

According to the fuel cell system of the present disclosure, the freezing of the gas and water discharge valve of the fuel gas system is prevented even at high altitude.

BRIEF DESCRIPTION OF THE DRAWINGS

In the accompanying drawings,

FIG. 2 is a flowchart illustrating an example of control of the fuel cell system of the present disclosure.

DETAILED DESCRIPTION

Figure 1:
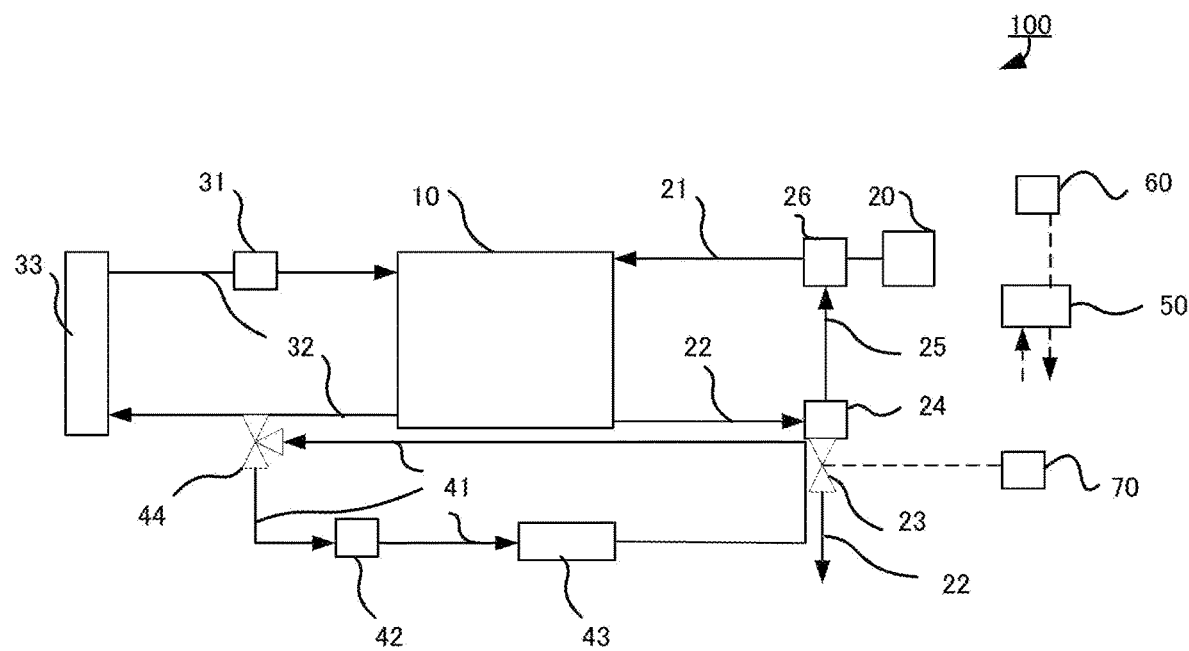
FIG. 1 is a schematic configuration diagram of an example of the fuel cell system of the present disclosure.

The fuel cell system of the present disclosure is a fuel cell system for air vehicles,
wherein the fuel cell system comprises:
a fuel cell,
a fuel gas system for supplying fuel gas to the fuel cell,
a cooling system for controlling a temperature of the fuel cell,
an altitude sensor,
a temperature sensor, and
a controller;
wherein the fuel gas system comprises a fuel gas supplier and a gas and water discharge valve for allowing fuel off-gas, which is discharged from the fuel cell, to be discharged to the outside;
wherein the cooling system comprises a refrigerant flow path for circulating a refrigerant in and out of the fuel cell and a heating flow path for heating the gas and water discharge valve by circulating the refrigerant, and the heating flow path branches from the refrigerant flow path and is disposed near the gas and water discharge valve;
wherein the heating flow path includes a circulation pump for circulating the refrigerant in the heating flow path, a water heater for heating the refrigerant, and a three-way valve for controlling a supply of the refrigerant from the refrigerant flow path and allowing the refrigerant to be circulated in the heating flow path; and
wherein, when the controller detects an altitude increase measured by the altitude sensor, and when a temperature of the gas and water discharge valve measured by the temperature sensor is less than a predetermined temperature, the controller increases a temperature of the refrigerant by controlling the three-way valve to circulate the refrigerant in the heating flow path and operating the circulation pump and the water heater to heat the refrigerant.

In the present disclosure, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

The fuel cell system of the present disclosure is mounted and used in an air vehicle.

The fuel cell system of the present disclosure may be mounted and used in an air vehicle that can fly by the power of a secondary cell.

The air vehicle of the present disclosure may be an aircraft. The aircraft may be an airplane, a vertical takeoff and landing aircraft or the like. The vertical takeoff and landing aircraft may be a helicopter, a drone or the like.

The air vehicle may include the fuel cell system of the present disclosure.

The fuel cell system of the present disclosure includes the fuel cell.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 600 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum (Pt) and ruthenium (Ru). As a catalyst-supporting material and a conductive material, examples include, but are not limited to, a carbonaceous material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nation membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the present disclosure, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flew path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate and a stainless-steel plate) obtained by press-molding. The separator may function as a collector.

The fuel cell may include a manifold such as an inlet manifold communicating between the supply holes and an outlet manifold communicating between the discharge holes.

As the inlet manifold, examples include, but are not limited to, an anode inlet manifold, a cathode inlet manifold, and a refrigerant inlet manifold.

As the outlet manifold, examples include, but are not limited to, an anode outlet manifold, a cathode outlet manifold, and a refrigerant outlet manifold.

The fuel cell system includes the altitude sensor.

The altitude sensor measures the altitude of the air vehicle.

The altitude sensor is electrically connected to the controller, and the controller detects the altitude of the air vehicle measured by the altitude sensor.

As the altitude sensor, a conventionally-known altimeter or the like may be used.

The fuel cell system includes the temperature sensor.

The temperature sensor measures the temperature of the gas and water discharge valve.

The temperature sensor is electrically connected to the controller, and the controller detects the temperature of the gas and water discharge valve measured by the temperature sensor.

As the temperature sensor, a conventionally-known thermometer or the like may be used.

The fuel cell system includes the fuel gas system.

The fuel gas system supplies fuel gas to the fuel cell.

The fuel gas system includes the fuel gas supplier and the gas and water discharge valve for allowing fuel off-gas, which is discharged from the fuel cell, to be discharged to the outside.

The fuel gas system may further include a fuel gas supply flow path, an ejector, a circulation flow path, a gas-liquid separator, a fuel off-gas discharge flow path, and so on.

The fuel gas supplier supplies the fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The fuel gas supply flow path connects the fuel gas supplier and the fuel gas inlet of the fuel cell. The fuel gas supply flow path allows the fuel gas to be supplied to the anode of the fuel cell. The fuel gas inlet may be the fuel gas supply hole, the anode inlet manifold, or the like.

In the fuel gas supply flow path, the ejector may be disposed.

For example, the ejector may be disposed at a junction with the circulation flow path on the fuel gas supply flow path. The ejector supplies a mixed gas containing the fuel gas and circulation gas to the anode of the fuel cell. As the ejector, a conventionally-known ejector may be used.

A pressure control valve and a medium-pressure hydrogen sensor may be disposed in a region between the fuel gas supplier and ejector of the fuel gas supply flow path.

The pressure control valve controls the pressure of the fuel gas supplied from the fuel gas supplier to the ejector.

The pressure control valve is electrically connected to the controller. The pressure of the fuel gas supplied to the ejector may be controlled by controlling the opening/closing, opening degree or the like of the pressure control valve by the controller.

The medium-pressure hydrogen sensor is electrically connected to the controller. The controller detects the fuel gas pressure measured by the medium-pressure hydrogen sensor. The pressure of the fuel gas supplied to the ejector may be controlled by controlling the opening/closing, opening degree or the like of the pressure control valve, based on the detected pressure.

The fuel off-gas discharge flow path connects the fuel gas outlet of the fuel cell and the outside of the fuel cell system.

In the fuel off-gas discharge flow path, a gas-liquid separator may be disposed in a region between the fuel gas outlet and the outside of the fuel cell system.

The fuel off-gas discharge flow path may branch from the circulation flow path through the gas-liquid separator.

The fuel off-gas discharge flow path discharges, to the outside of the fuel cell system, the fuel off-gas discharged from the fuel gas outlet of the fuel cell. The fuel gas outlet may be the fuel gas discharge hole, the anode outlet manifold, or the like.

The gas and water discharge valve (the fuel off-gas discharge valve) may be disposed in the fuel off-gas discharge flow path. The gas and water discharge valve is disposed downstream from the gas-liquid separator in the fuel off-gas discharge flow path.

The gas and water discharge valve allows the fuel off-gas, water and the like to be discharged to the outside (of the system). The outside may be the outside of the fuel cell system, or it may be the outside of the air vehicle.

The gas and water discharge valve may be electrically connected to the controller, and the flow rate of the fuel off-gas discharged to the outside and the flow rate of the discharged water (liquid water) may be controlled by controlling the opening and closing of the gas and water discharge valve by the controller. By controlling the opening degree of the gas and water discharge valve, the pressure of the fuel gas supplied to the anode of the fuel cell (anode pressure) may be controlled.

The fuel off-gas may contain the fuel gas that has passed through the anode without reacting, and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

The circulation flow path may connect the fuel gas outlet of the fuel cell and the ejector.

The circulation flow path may branch from the fuel off-gas discharge flow path and connect to the ejector disposed in the fuel gas supply flow path, thereby merging with the fuel gas supply flow path.

The circulation flow path may branch from the fuel off-gas discharge flow path through the gas-liquid separator and connect to the ejector disposed in the fuel gas supply flow path, thereby merging with the fuel gas supply flow path.

The circulation flow path allows the fuel off-gas, which is the fuel gas discharged from the fuel gas outlet of the fuel cell, to be recovered and supplied to the fuel cell as the circulation gas.

A gas circulation pump may be disposed in the circulation flow path. The gas circulation pump circulates the fuel off-gas as the circulation gas. The gas circulation pump may be electrically connected to the controller, and the flow rate of the circulation gas may be controlled by controlling ON/OFF, rotational speed, etc., of the gas circulation pump by the controller.

The gas-liquid separator (anode gas-liquid separator) may be disposed in the circulation flow path.

The gas-liquid separator may be disposed at the branch point of the fuel off-gas discharge flow path and the circulation flow path. Accordingly, the flow path from the fuel gas outlet to the gas-liquid separator may be the fuel off-gas discharge flow path or the circulation flow path.

The gas-liquid separator is disposed upstream from the gas and water discharge valve of the fuel off-gas discharge flow path.

The gas-liquid separator separates the water (liquid water) and the fuel off-gas which is the fuel gas discharged from the fuel gas outlet. Accordingly, the fuel off-gas may be returned to the circulation flow path as the circulation gas, or unnecessary gas, water and the like may be discharged to the outside by opening the gas and water discharge valve of the fuel off-gas discharge flow path. In addition, the gas-liquid separator can suppress the flow of excess water into the circulation flow path. Accordingly, the occurrence of freezing of the circulation pump or the like due to the water, can be suppressed.

The fuel cell system includes the cooling system of the fuel cell.

The cooling system controls the temperature of the fuel cell.

The cooling system includes the refrigerant flow path and the heating flow path.

The refrigerant flow path allows the refrigerant to circulate in and out of the fuel cell. The refrigerant flow path communicates between a refrigerant supply hole and a refrigerant discharge hole, which are holes provided in the fuel cell, and it allows the refrigerant to circulate in and out of the fuel cell.

The refrigerant flow path may be provided with a refrigerant supplier. The refrigerant supplier is electrically connected to the controller. The refrigerant supplier is operated according to a control signal from the controller. The flow rate of the refrigerant supplied from the refrigerant supplier to the fuel cell, is controlled by the controller. The temperature of the fuel cell may be controlled thereby. As the refrigerant supplier, examples include, but are not limited to, a cooling water pump.

The refrigerant flow path may be provided with a radiator for heat dissipation from the cooling water.

The refrigerant flow path may be provided with a reserve tank for storing the refrigerant.

The heating flow path branches from the refrigerant flow path and is disposed near the gas and water discharge valve. The heating flow path heats the gas and water discharge valve by circulating the refrigerant. The position to dispose the heating flow path near the gas and water discharge valve is not particularly limited, as long as it is a position at which the temperature of the refrigerant is transferred from the heating flow path to the gas and water discharge valve to heat the gas and water discharge valve. For example, the heating flow path may cover the gas and water discharge valve to be in direct contact with the gas and water discharge valve, or the heating flow path may be disposed around the gas and water discharge valve at predetermined intervals.

The heating flow path includes the circulation pump, the water heater, and the three-way valve.

The circulation pump circulates the refrigerant in the heating flow path. The circulation pump is electrically connected to the controller. The circulation pump is operated according to a control signal from the controller. The flow rate of the refrigerant circulating in the heating flow path, is controlled by the controller. The temperature of the gas and water discharge valve may be controller thereby. As the circulation pump, examples include, but are not limited to, a cooling water pump.

The water heater heats the refrigerant. The water heater is electrically connected to the controller. The turning on and off of the water heater is controlled according to a control signal from the controller, and the temperature of the refrigerant circulating in the heating flow path is controlled by the controller.

The three-way valve controls the supply of the refrigerant from the refrigerant flow path and allows the refrigerant to be circulated in the heating flow path. Accordingly, the refrigerant flow path may be connected to one of the three valves of the three-way valve, and the heating flow path may be connected to the remaining two valves of the three-way valve and branch from the refrigerant flow path through the three-way valve. Two of the three valves of the three-way valve may be used as an inlet valve and an outlet valve, and the heating flow path may be connected to the valves and looped to allow the circulation of the refrigerant. The three-way valve is electrically connected to the controller. The opening and closing of the valves of the three-way valve is controlled according to a control signal from the controller. The refrigerant may be supplied from the refrigerant flow path to the heating flow path by opening the refrigerant flow path-side valve of the three-way valve and at least one of the heating flow path-side two valves (the inlet valve and the outlet valve) of the three-way valve by the controller. The three-way valve may circulate the refrigerant in the heating flow path by closing the refrigerant flow path-side valve and opening the heating flow path-side two valves (the inlet valve and the outlet valve) by the controller.

The fuel cell system may include an oxidant gas system.

The oxidant gas system may include an oxidant gas supplier, an oxidant gas supply flow path, an oxidant off-gas discharge flow path, an oxidant gas bypass flow path, a bypass valve, an oxidant gas flow rate sensor, and so on.

The oxidant gas supplier supplies the oxidant gas to the fuel cell. More specifically, the oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is operated according to a control signal from the controller. At least one selected from the group consisting of the flow rate and pressure of the oxidant gas supplied from the oxidant gas supplier to the cathode, may be controlled by the controller.

The oxidant gas supply flow path connects the oxidant gas supplier and the oxidant gas inlet of the fuel cell. The oxidant gas supply flow path allows the oxidant gas to be supplied from the oxidant gas supplier to the cathode of the fuel cell. The oxidant gas inlet may be the oxidant gas supply hole, the cathode inlet manifold, or the like.

The oxidant off-gas discharge flow path is connected to the oxidant gas outlet of the fuel cell. The oxidant off-gas discharge flow path allows the oxidant off-gas, which is the oxidant gas discharged from the cathode of the fuel cell, to be discharged to the outside. The oxidant gas outlet may be the oxidant gas discharge hole, the cathode outlet manifold, or the like.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. The pressure of the oxidant gas supplied, to the cathode (cathode pressure) may be controlled by controlling the opening degree of the oxidant gas pressure control valve.

The oxidant gas bypass flow path branches from the oxidant gas supply flow path, bypasses the fuel cell, and connects the branch of the oxidant gas supply flow path and the junction of the oxidant off-gas discharge flow path.

The bypass valve is disposed in the oxidant gas bypass flow path.

The bypass valve is electrically connected to the controller. By opening the bypass valve by the controller, when it is unnecessary to supply the oxidant gas to the fuel cell, the oxidant gas can bypass the fuel cell and be discharged to the outside from the oxidant off-gas discharge flow path.

The oxidant gas flow rate sensor is disposed in the oxidant gas supply flow path.

The oxidant gas flow rate sensor detects the flow rate of the oxidant gas in the oxidant gas system. The oxidant gas flow rate sensor is electrically connected to the controller. The controller may estimate the rotational speed of the air compressor from the flow rate of the oxidant gas detected by the oxidant gas flow rate sensor. The oxidant gas flow rate sensor may be disposed upstream from the oxidant gas supplier of the oxidant gas supply flow path.

As the oxidant gas flow rate sensor, a conventionally-known flow meter or the like may be used.

The fuel cell system may include a secondary cell.

The secondary cell (battery) may be any chargeable and dischargeable cell. For example, the secondary cell may be a conventionally-known secondary cell such as a nickel-hydrogen secondary cell and a lithium ion secondary cell. The secondary cell may include a power storage device such as an electric double layer capacitor. The secondary cell may have a structure such that a plurality of secondary cells are connected in series. The secondary cell supplies power to the motor, the oxidant gas supplier and the like. The secondary cell may be rechargeable by a power source outside the air vehicle, for example. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to a switch which may be mounted in the air vehicle. The controller may be operable by an external power source even if the switch is turned OFF.

When the controller detects an altitude increase measured by the altitude sensor, and when the temperature of the gas and water discharge valve measured by the temperature sensor is less than the predetermined temperature, the controller increases the temperature of the refrigerant by controlling the three-way valve to circulate the refrigerant in the heating flow path and operating the circulation pump and the water heater to heat the refrigerant.

In the present disclosure, when the altitude is high, heat retention control in the cooling system by the water heater can be enhanced, and the freezing of the gas and water discharge valve of the fuel gas system can be prevented.

The predetermined temperature of the gas and water discharge valve may be a temperature at which droplets are attached to the gas and water discharge valve and frozen. It may be appropriately set considering fuel efficiency and so on.

More specifically, controlling the three-way valve to circulate the refrigerant in the heating flow path may be, for example, controlling the three-way valve to close the refrigerant flow path-side valve and open the heating flow path-side two valves (the inlet valve and the outlet valve).

FIG. 1 is a schematic configuration diagram of an example of the fuel cell system of the present disclosure.

A fuel cell system 100 shown in FIG. 1 includes a fuel cell 10, a fuel gas supplier 20, a fuel gas supply flow path 21, a fuel off-gas discharge flow path 22, a gas and water discharge valve 23, a gas-liquid separator 24, a circulation flow path 25, an ejector 26, a refrigerant supplier 31, a refrigerant flow path 32, a radiator 33, a heating flow path 41, a circulation pump 42, a water heater 43, a three-way valve 44, a controller 50, an altitude sensor 60 and a temperature sensor 70. In FIG. 1, only the fuel gas and cooling systems are illustrated, and other systems such as the oxidant gas system are not illustrated.

FIG. 2 is a flowchart illustrating an example of control of the fuel cell system of the present disclosure.

First, the altitude sensor measures the altitude of the air vehicle, and the temperature sensor measures the temperature of the gas and water discharge valve.

Next, when the controller detects an altitude increase measured by the altitude sensor, and when the temperature of the gas and water discharge valve measured by the temperature sensor is less than the predetermined temperature, the controller increases the temperature of the refrigerant by controlling the three-way valve to circulate the refrigerant in the heating flow path and operating the circulation pump and the water heater to heat the refrigerant. Then, the controller ends the control.

On the other hand, when the controller does not detect the altitude increase measured by the altitude sensor, or when the temperature of the gas and water discharge valve measured by the temperature sensor is equal to or more than the predetermined temperature, the controller may end the control; the controller may stop the operation of at least one of the circulation pump and the water heater; or the controller may stop the operation of the circulation pump and the water heater. As the case where the controller does not detect the altitude increase, examples include, but are not limited to, a case where the air vehicle levels off at a predetermined altitude. In this case, a variation in the temperature of the gas and water discharge valve is small, and freezing is less likely to occur. In this case, accordingly, from the viewpoint of increasing fuel efficiency, the operation of at least one of the circulation pump and the water heater may be stopped.

REFERENCE SIGNS LIST

10. Fuel cell
20. Fuel gas supplier
21. Fuel gas supply flow path
22. Fuel off-gas discharge flow path
23. Gas and water discharge valve
24. Gas-liquid separator
25. Circulation flow path 26. Ejector
31. Refrigerant supplier
32. Refrigerant flow path
33. Radiator
41. Heating flow path
42. Circulation pump
43. Water heater
44. Three-way valve
50. Controller
60. Altitude sensor
70. Temperature sensor
100. Fuel cell system

The invention claimed is:

1. An air vehicle comprising a fuel cell system,
wherein the fuel cell system comprises:
 a fuel cell,
 a fuel gas system for supplying fuel gas to the fuel cell,
 a cooling system for controlling a temperature of the fuel cell,
 an altitude sensor,
 a temperature sensor, and
 a controller;
wherein the fuel gas system comprises a fuel gas supplier and a gas and water discharge valve for allowing fuel off-gas, which is discharged from the fuel cell, to be discharged to the outside;
wherein the cooling system comprises a refrigerant flow path for circulating a refrigerant in and out of the fuel cell and a heating flow path for heating the gas and water discharge valve by circulating the refrigerant, and the heating flow path branches from the refrigerant flow path and is disposed near the gas and water discharge valve;
wherein the heating flow path includes a circulation pump for circulating the refrigerant in the heating flow path, a water heater for heating the refrigerant, and a three-way valve for controlling a supply of the refrigerant from the refrigerant flow path and allowing the refrigerant to be circulated in the heating flow path; and
wherein, when the controller detects an altitude increase measured by the altitude sensor, and when a temperature of the gas and water discharge valve measured by the temperature sensor is less than a predetermined temperature, the controller is configured to increase a temperature of the refrigerant by controlling the three-way valve to circulate the refrigerant in the heating flow path and operating the circulation pump and the water heater to heat the refrigerant; and
wherein, when the controller does not detect the altitude increase measured by the altitude sensor, or when the temperature of the gas and water discharge valve measured by the temperature sensor is equal to or more than the predetermined temperature, the controller is configured to stop the operation of at least one of the circulation pump and the water heater.

* * * * *